C. H. KINDL

IGNITION TIMER

Dec. 8, 1931.

Re. 18,276

Original Filed Jan. 12, 1926

Inventor

Carl H. Kindl

By Spencer Sewall & Hardman his Attorneys

Reissued Dec. 8, 1931

Re. 18,276

UNITED STATES PATENT OFFICE

CARL H. KINDL, OF DAYTON, OHIO, ASSIGNOR, BY MESNE ASSIGNMENTS, TO DELCO-REMY CORPORATION, OF DAYTON, OHIO, A CORPORATION OF DELAWARE

IGNITION TIMER

Original No. 1,766,908, dated June 24, 1930, Serial No. 80,714, filed January 12, 1926. Application for reissue filed October 26, 1931. Serial No. 571,224.

This invention relates to ignition timer-distributor units for internal combustion engines commonly known as "distributors," and includes among its objects such simplification of construction as will be conducive to economy of manufacture, the ease of adjustment of the extent of opening of the timer contacts, and the ease of replacement of members carrying the timer contacts.

Further objects and advantages of the present invention will be apparent from the following description, reference being had to the accompanying drawings wherein a preferred form of embodiment of the present invention is clearly shown.

Figure 1:
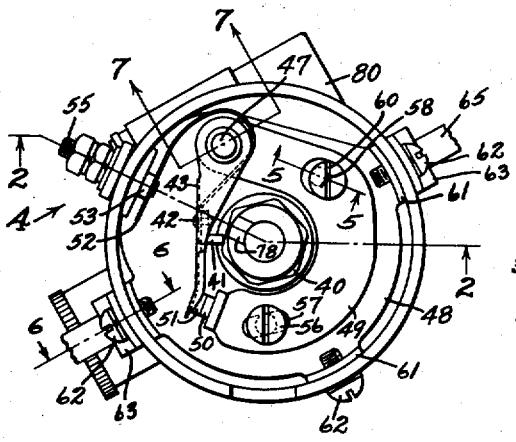
Fig. 1 is a plan view of a form of apparatus embodying the present invention, the distributor head and rotor being removed.
Figure 6:
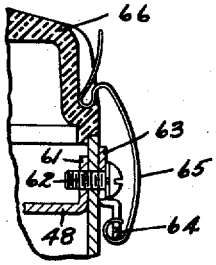
Figure 5:
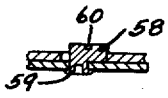
Figure 7:
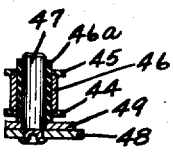

Figs. 5, 6 and 7 are fragmentary sectional views taken respectively on the lines 5—5, 6—6 and 7—7 of Fig. 1.

Figure 3:
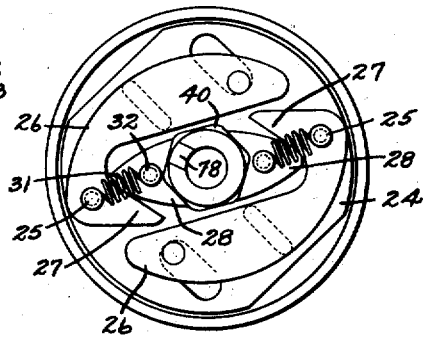
Fig. 3 is a plan view of the apparatus shown in Fig. 1, the ignition breaker lever and breaker plate being removed to show the automatic spark timing controller.
Figure 2:
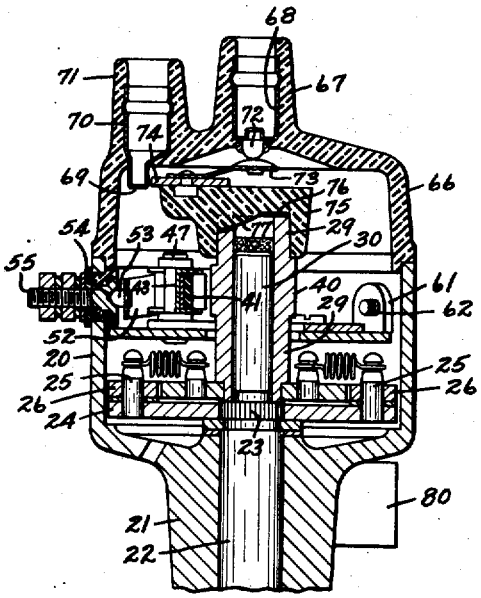
Fig. 2 is a longitudinal sectional view taken on the line 2—2 of Fig. 1.
Figure 4:
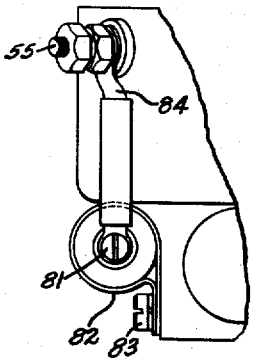
Fig. 4 is a fragmentary side view looking in the direction of the arrow 4 in Fig. 1, and shows the connection between the timer terminal and the condenser.

Referring to the drawings 20 designates the ignition timer housing or cup which is provided with a shank 21 by which the timer is attached to the frame of an engine not shown. The shank 21 provides a bearing for the ignition timer shaft 22 which is provided with a knurled portion 23 around which is press-fitted a plate 24 carrying studs 25 for pivotally supporting weights 26. Each weight 26 is provided with a camming lever portion 27 for engaging one of two lever arms 28 which are attached to a sleeve 29 freely rotatable upon the reduced upper end portion 30 of the timer shaft 22. The weights are normally maintained in the position shown in Fig. 3 by springs 31 which are attached to the weight studs 25 and to studs 32 carried by the arms 28.

The sleeve 29 is provided with a cam portion 40 which cooperates with a rubbing block or cam follower 41 which is attached by rivet 42 to a breaker lever 43. The lever 43 is generally channel-shaped in cross section and has its flanges 44 and 45 attached to a hub 46 within which is pressed a non-conducting sleeve 46ª which is pivotally supported by a stud 47 anchored to a breaker lever plate 48. As shown in Fig. 7, the lower end of the sleeve 46ª rests upon a contact bracket 49 which is pivotally supported by the stud 47 and is laterally supported by the plate 48. A contact bracket 49 carries a contact 50 which is engaged by a contact 51 attached to the lever 43. The contact 51 is maintained in engagement with the contact 50 or the cam follower 41 in engagement with the cam 40 by a leaf spring 52 which is secured by the rivet 42 to the web of the lever 43 and which is provided with a conducting button 53 which is resiliently urged into a recess 54 provided by conducting terminal screw 55 which is insulatingly and non-rotatably supported by the timer cup 20. It is therefore apparent that the breaker lever 43 is maintained upon the stud 47 by the cooperation of the members 53 and 55. To remove the lever 43 from the timer cup the free end of the spring 52 is moved toward the center of the cup to release the button 53 from the socket 54. Then the lever may be pulled out of the timer cup and off the stud 47.

As the rubbing block 41 wears away the amount of contact separation will decrease unless the position of the stationary contact 50 is changed. This is accomplished by adjusting the contact bracket 49 relative to the stud 47. The adjustment is made by first loosening a screw 56 which passes through a slot 57 concentric with the stud 47 and which threadedly engages the bracket 48. Then an eccentric 58, which is pivotally supported at 59 by the plate 48, is turned by applying a screw-driver to the screw-driver slot 60 of the eccentric. Since the lever 43 and the bracket 49 are co-axially pivoted there will be no relative movements between the contacts 50 and 51 when this adjustment is made. The adjustment merely changes the distance between the rubbing block 41 and the cam 40.

When replacing the lever 43 and bracket 49 in order to provide new contacts 51 and 50, the lever 43 is removed in the manner described and the screw 56 is removed to permit removal of the bracket 49.

The breaker lever plate 48 is provided with ears 61 which are attached to the timer cup 20 by screws 62. Certain of these screws 62, which are diametrically opposite, secure to the timer cup two brackets 63 which provide hinge pins 64 for two resilient clips 65 which secure to the timer cup 20 a non-conducting distributor head 66. The head 66 is provided with a center cable-receiving sleeve 67 having a conducting lining member 68, and a plurality of distributor posts 69 formed of sheet metal and which are arranged in a circular row concentric with the sleeve 67. Each post 69 is formed integrally with the conducting lining member 70 of a cable-receiving sleeve 71. The member 68 is in electrical contact with a conducting button 72 which is engaged by the free end of a leaf spring conductor 73 which is connected with a distributing segment 74 carried by a non-conducting distributor rotor 75. The rotor 75 is provided with a socket 76 for receiving the upper end of the sleeve 29, and interiorly of the socket, with a rib 77 which is received by a notch 78 provided in the upper end of the sleeve 29. In this manner the rotor 75 is located correctly with respect to the sleeve 29 and cam 40 and is driven thereby.

An electrical condenser is housed within a metallic condenser case 80 and has one of its foils electrically connected with the case and the other with a terminal screw 81 which is insulatingly supported by the case. The case 80 is attached by a metallic clip 82 and a screw 83 to the timer housing 20. A conductor 84 connects the insulated condenser terminal 81 with the screw 55. In this manner the condenser is connected in parallel with the timer contacts 50 and 51.

While the form of embodiment of the present invention as herein disclosed, constitutes a preferred form, it is to be understood that other forms might be adopted, all coming within the scope of the claims which follow.

What is claimed is as follows:

1. An ignition distributor, comprising in combination, a housing including wall portions; a breaker mechanism in said housing, comprising a stationary contact adapted to be engaged by a contact carried on a pivoted lever: a cam for operating said pivoted lever; a terminal comprising an insulating member supported in a wall of the housing, said member having a conductor supported therein, the conductor being provided with a recess inside the housing; and a resilient conductor blade, one end of which is secured to the pivoted lever, adjacent the other end there being a button secured to said blade, said button being adapted to fit into the recess of the conductor, whereby said blade is retained in proper position and electrically connected with the conductor.

2. An ignition distributor comprising, in combination, a housing, a cam rotatable within the housing centrally thereof, a breaker lever pivotally supported within the housing and carrying a rubbing block engageable with the cam and an interrupter contact, a bracket carrying a contact cooperating with the contact on the lever, said bracket being pivotally supported by the housing, coaxially with respect to the breaker lever, means for adjusting the bracket relative to the housing, said means comprising a disc eccentrically pivotally connected with the housing and received by a slot in the bracket, the turning of the disc effecting rotation of the bracket, and means for securing the bracket, to the housing in adjusted position.

3. An ignition distributor according to claim 2 in which the disc is eccentric relative to a shank integral therewith, the shank being supported by the housing for rotation relative thereto.

4. An ignition distributor comprising in combination, a housing, a cam rotatable within the housing centrally thereof, a plate within the housing carrying a stud, a breaker lever pivoted upon said stud and carrying a rubbing block engageable with said cam and an interrupter contact; a bracket pivoted at one end upon said stud and carrying a contact engageable with the contact of the lever, and having an approximately arcuate slot concentric with said stud and a slot extending approximately radially with respect to said stud; a disc received by the radially disposed slot in the bracket and having an eccentric-pivotal connection with the plate, the disc having an exposed slot for receiving a screw-driver whereby turning the disc will rotate the bracket about the stud; and a screw extending through the arcuate slot and having threaded connection with the plate for securing the bracket to the plate in adjusted position.

5. An ignition distributor comprising, in combination, a cup-shaped housing, a cam rotatable within the housing centrally thereof, a plate within the housing having an aperture to provide clearance for the cam, a breaker lever pivotally supported by said plate within the cup and located at one side of said aperture and cam, a rubbing block carried by said lever for engaging said cam, a U-shaped bracket supported at one end by the plate coaxially of the lever and extending around the side of said cam opposite to said lever, cooperating interrupter contacts, carried respectively by the free end of the lever and bracket, a screw passing through a slot near the free end of the bracket and threadedly engaging the plate to clamp the bracket to the plate in adjusted position, and means for adjusting the bracket relative to the plate and comprising a disc eccentrically pivoted upon said plate and received by a slot in said bracket intermediate the pivot of the bracket and the first mentioned slot.

6. An ignition distributor comprising, in combination, a housing, a cam rotatable within the housing, a breaker lever pivotally supported within the housing and carrying a rubbing block engageable with the cam and an interrupter contact, a bracket pivotally supported in the housing and carrying a contact cooperating with the contact on the lever, a spring urging the lever toward the cam and its contact toward the contact of the bracket, and means for adjusting the extent of contact separation, said means comprising a disc eccentrically pivotally connected with the housing and received by a slot in the bracket, the turning of the disc effecting rotation of the bracket, and means for securing the bracket to the housing in adjusted position.

7. An ignition distributor comprising, in combination, a housing, a cam rotatable within the housing centrally thereof, a plate within the housing carrying a stud, a breaker lever pivoted upon said stud and carrying a rubbing block engageable with said cam and an interrupter contact; a bracket pivoted at one end upon said plate and carrying a contact engageable with the contact of the lever, and having an approximately arcuate slot concentric with its pivotal support and a slot extending approximately radially with respect to its pivotal support; means for adjusting the extent of contact separation and including a disc received by the radially disposed slot in the bracket and having an eccentric-pivotal connection with the plate, the disc having an exposed slot for receiving a screwdriver whereby turning the disc will rotate the bracket about the stud; and a screw extending through the arcuate slot and having threaded connection with the plate for securing the bracket to the plate in adjusted position.

In testimony whereof I hereto affix my signature.

CARL H. KINDL.